US 10,664,956 B2

(12) United States Patent
Chen (10) Patent No.: US 10,664,956 B2
(45) Date of Patent: May 26, 2020

(54) IMAGE PROCESSING APPARATUS AND PROGRAM (71) Applicant: EIZO Corporation, Ishikawa (JP)

(72) Inventor: Haifeng Chen, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 77 days.

(21) Appl. No.: 16/060,597

(22) PCT Filed: Oct. 28, 2016

(86) PCT No.: PCT/JP2016/081977
§ 371 (c)(1),
(2) Date: Jun. 8, 2018

(87) PCT Pub. No.: WO2017/098832
PCT Pub. Date: Jun. 15, 2017

(65) Prior Publication Data
US 2018/0374198 A1    Dec. 27, 2018

(30) Foreign Application Priority Data

Dec. 9, 2015    (JP) .................................. 2015-240071

(51) Int. Cl.
G06T 5/00    (2006.01)
G06T 5/20    (2006.01)
(Continued)

(52) U.S. Cl.
CPC .............. *G06T 5/003* (2013.01); *G06T 5/002* (2013.01); *G06T 5/20* (2013.01); *G06T 7/13* (2017.01);
(Continued)

(58) Field of Classification Search
CPC ........... G06T 5/003; G06T 7/13; G06T 5/002; G06T 5/20; H04N 1/409
See application file for complete search history.

(56) References Cited

U.S. PATENT DOCUMENTS 6,473,531 B1    10/2002 Kunitake
2004/0156559 A1    8/2004 Cheng et al.
(Continued)

FOREIGN PATENT DOCUMENTS

EP    1 909 227 A1    4/2008
JP    H06152992 A    5/1994
(Continued)

OTHER PUBLICATIONS

Partial European Search Report dated Oct. 24, 2018 in corresponding European patent application No. 16872732.9; 19 pgs.
(Continued)

*Primary Examiner* — David F Dunphy
(74) *Attorney, Agent, or Firm* — Maier & Maier, PLLC (57) ABSTRACT

[Problem] Provided is an image processing apparatus and program that are able to suppress ringing caused in image data having increased image quality while considering the sharpness of the image data.
[Solving Means] An image processing apparatus includes a ringing incidence estimation unit configured to estimate an incidence of ringing representing a probability that ringing will occur, on the basis of input image data, a sharpness estimation unit configured to estimate a sharpness emphasis level representing intensity of sharpness of an input image represented by the input image data, on the basis of the input image data, and an adjuster configured to perform an adjustment process to suppress a level of image conversion on each pixel in converted image data obtained by performing the image conversion on the input image data, on the basis of the incidence of ringing and/or the sharpness emphasis level.

10 Claims, 4 Drawing Sheets (51) Int. Cl.
*G06T 7/13* (2017.01)
*H04N 1/409* (2006.01)

(52) U.S. Cl.
CPC ... *H04N 1/409* (2013.01); *G06T 2207/20012* (2013.01); *G06T 2207/20192* (2013.01)

(56) References Cited

U.S. PATENT DOCUMENTS

| | | | |
|---|---|---|---|
| 2007/0160278 A1* | 7/2007 | Fairbanks | G06T 5/20 382/128 |
| 2008/0085061 A1 | 4/2008 | Arici et al. | |
| 2008/0123989 A1* | 5/2008 | Lin | G06T 5/002 382/275 |
| 2008/0304758 A1 | 12/2008 | Kobayashi | |
| 2009/0060370 A1* | 3/2009 | Pedersen | G06T 5/002 382/261 |
| 2009/0202167 A1* | 8/2009 | Muijs | H04N 1/409 382/254 |
| 2012/0301049 A1* | 11/2012 | Mori | G06T 5/003 382/266 |
| 2017/0024863 A1* | 1/2017 | Sugimoto | G06T 5/003 |

FOREIGN PATENT DOCUMENTS

| | | |
|---|---|---|
| JP | 2000101846 A | 4/2000 |
| JP | 2006507775 A | 3/2006 |
| JP | 2008306656 A | 12/2008 |
| JP | 2010-212782 A | 9/2010 |
| JP | 2012249079 A | 12/2012 |
| WO | 2010131296 A1 | 11/2010 |

OTHER PUBLICATIONS

Vladimir Khryashchev, et al., "A Novel Smart Bilateral Filter for Ringing Artifacts Removal in JPEG2000 Images", Proc. of Int. Conf. on Computer Graphics and Vision, Jul. 27, 2010 (Jul. 27, 2010), pp. 122-128; 7pgs.
International Search Report dated Jan. 31, 2017 of corresponding International Application No. PCT/JP2016/081977; 2 pgs.

* cited by examiner

Fig. 3B BIG EDGE IS PRESENT AROUND

Fig. 3A SUM OF FLAT PIXELS

Fig. 4B RINGING ESTIMATION RESULT

Fig. 4A INPUT IMAGE

IMAGE PROCESSING APPARATUS AND PROGRAM

TECHNICAL FIELD

The present invention relates to an image processing apparatus and program that are able to suppress ringing caused in converted image data obtained by converting input image data, while considering the sharpness of the image data.

BACKGROUND ART

To convert an image, various types of image conversion processes are being employed. However, when the wavelength component of image data is modulated in an image conversion process, there may occur so-called "ringing," where a streak appears around an edge.

Patent Literature 1 discloses an image sharpening apparatus that aims to suppress emphasis of ringing and to sharpen a blurred image and includes a storage unit that stores an input image and a temporarily sharpened image having the pixel value of the input image as an initial value, a determination unit that determines whether each pixel of the input image belongs to an edge region, a range calculator that calculates the upper and lower limits of pixel values in a limited range from the distribution of the values of pixels near an edge pixel determined to belong to the edge region in the input image or the distribution of the values of pixels near a pixel in the temporarily sharpened image corresponding to the edge pixel, and a converter that (a) calculates a trial pixel value which is the sum of values obtained by multiplying the values of the pixels near the corresponding pixel by weighting factors corresponding to the distances from the corresponding pixel to the near pixels, (b1) obtains the converted values of the pixels near the corresponding pixel so that the difference between the value of the edge pixel and a trial pixel value calculated from the converted values of the pixels near the corresponding pixel becomes smaller than the difference between the value of the edge pixel and the trial pixel value, and (b2) writes, to the pixel values of the temporarily sharpened image, pixel values obtained by correcting the converted pixel values so that the converted pixel values fall within the limited range.

CITATION LIST

Patent Literature

[Patent Literature 1] Japanese Unexamined Patent Application Publication No. 2010-212782

SUMMARY OF THE INVENTION

Technical Problem

The method of Patent Literature 1 can sharpen a blurred image while suppressing ringing around an edge, but it has difficulty in suppressing ringing considering the sharpness of the image.

The present invention has been made in view of the foregoing, and an object thereof is to provide an image processing apparatus and program that are able to suppress ringing caused in converted image data, while considering sharpness of the image data.

Solution to Problem

The present invention provides an image processing apparatus including a ringing incidence estimation unit configured to estimate an incidence of ringing representing a probability that ringing will occur, on the basis of input image data, a sharpness estimation unit configured to estimate a sharpness emphasis level representing intensity of sharpness of an input image represented by the input image data, on the basis of the input image data, and an adjuster configured to perform an adjustment process to suppress a level of image conversion on each pixel in converted image data obtained by performing the image conversion on the input image data, on the basis of the incidence of ringing and/or the sharpness emphasis level.

The present inventors noted that when input image data representing an unblurred image (that is, an image having a high level of sharpness) is converted, an excessively corrected image is outputted and ringing tends to occur in such an output image. The present inventors also noted that when input image data representing a blurred image (that is, an image having a low level of sharpness) is converted, a corrected image is outputted, but ringing tends to occur around an edge in such an output image. The present inventors then found an idea of further improving the image quality by suppressing ringing considering the sharpness of image data, and completed the present invention.

Various embodiments of the present invention are described below. The embodiments below can be combined with each other.

Preferably, the ringing incidence estimation unit includes a ringing flag setting unit configured to regard one pixel included in the input image data as a target pixel and to, when ringing is expected to occur on the target pixel, on the basis of a characteristic quantity of a near pixel region including the target pixel and multiple pixels near the target pixel, set a ringing flag on the target pixel, and the adjuster performs different adjustment processes on the target pixel on the basis of whether the ringing flag is set on the target pixel.

Preferably, when the ringing flag is set on the target pixel, the adjuster performs, on the target pixel, an adjustment process to suppress the level of the image conversion to a greater extent than when the ringing flag is not set on the target pixel.

Preferably, when the ringing flag is not set on the target pixel, the adjuster performs an adjustment process on the target pixel on the basis of the sharpness emphasis level.

Preferably, when the ringing flag is set on the target pixel, the adjuster performs an adjustment process on the target pixel on the basis of the incidence of ringing and the sharpness emphasis level.

Preferably, an adjustment process performed by the adjuster involves calculating a gradation value of the target pixel included in output image data by mixing a gradation value of the target pixel included in the input image data and a gradation value of the target pixel included in the converted image data at a predetermined ratio.

Preferably, the image processing apparatus further includes an adjustment factor calculator configured to calculate an adjustment factor by which a gradation value of the target pixel included in the converted image data is multiplied, and the adjuster multiplies the gradation value of the target pixel included in the converted image data by the adjustment factor and multiplies a gradation value of the target pixel included in the input image data by a value attributable to the adjustment factor.

Preferably, the adjustment factor calculator calculates the adjustment factor on the basis of the sharpness emphasis level, or the sharpness emphasis level and the incidence of ringing.

Preferably, the ringing incidence estimation unit estimates the incidence of ringing of the target pixel on the basis of the number of pixels on which the ringing flag is set in the near pixel region.

Preferably, the sharpness estimation unit estimates the sharpness emphasis level on the basis of a sum of variances of pixel values included in image data obtained by processing the input image data using a low-pass filter and a sum of variances of pixel values included in the input image data.

Preferably, there is provided a ringing estimation apparatus including a big edge determination unit configured to, when a characteristic quantity of a near pixel region including a target pixel included in input image data and a plurality of pixels near the target pixel exceeds a predetermined first threshold, determine that the target pixel is a big edge, a flat pixel determination unit configured to, when the characteristic quantity of the near pixel region falls below a predetermined second threshold, determine that the target pixel is a flat pixel, a sum calculator configured to, when the target pixel is determined to be the flat pixel, calculate a sum of the flat pixels included in the near pixel region, a flat portion determination unit configured to, when the sum of the flat pixels included in the near pixel region exceeds a predetermined third threshold, determine that the near pixel region around the target pixel is a flat portion, and an expectation unit configured to, when the big edge determination unit determines that the target pixel is the big edge, or when the flat portion determination unit determines that the near pixel region around the target pixel is a flat portion and the big edge is included in the near pixel region, expect that ringing will occur on the target pixel.

Preferably, there is provided a program causing a computer to function as a ringing incidence estimation unit configured to estimate an incidence of ringing representing a probability that ringing will occur, on the basis of input image data, a sharpness estimation unit configured to estimate a sharpness emphasis level representing intensity of sharpness of an input image represented by the input image data, on the basis of the input image data, and an adjuster configured to perform an adjustment process to suppress a level of image conversion on each pixel in converted image data obtained by performing the image conversion on the input image data, on the basis of the incidence of ringing and/or the sharpness emphasis level.

DESCRIPTION OF EMBODIMENTS

Now, an embodiment of the present invention will be described with reference to the drawings. Various features described in the embodiment below can be combined with each other.

Figure 1:
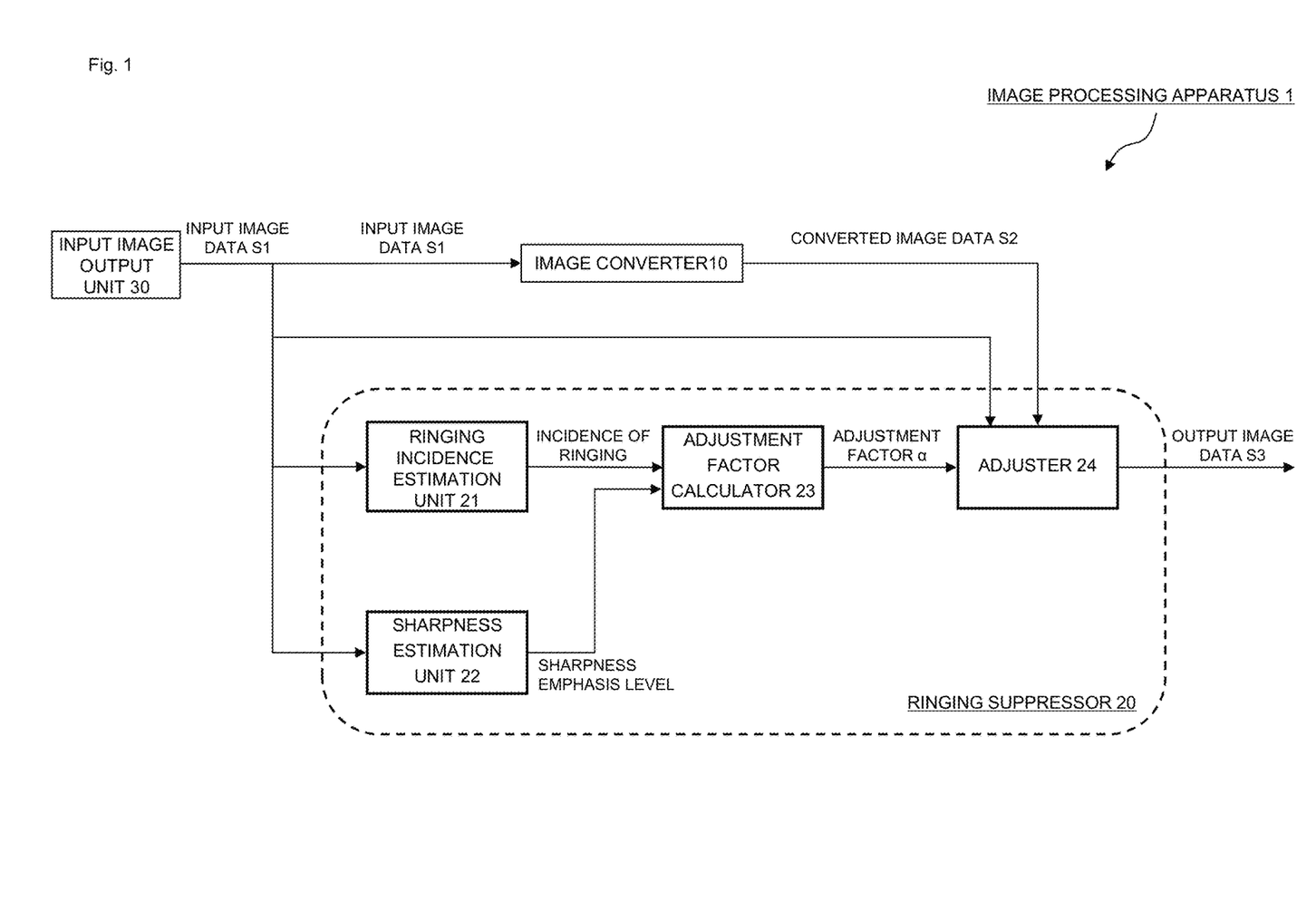
FIG. 1 is a block diagram of an image processing apparatus 1 of one embodiment of the present invention.
Figure 2:
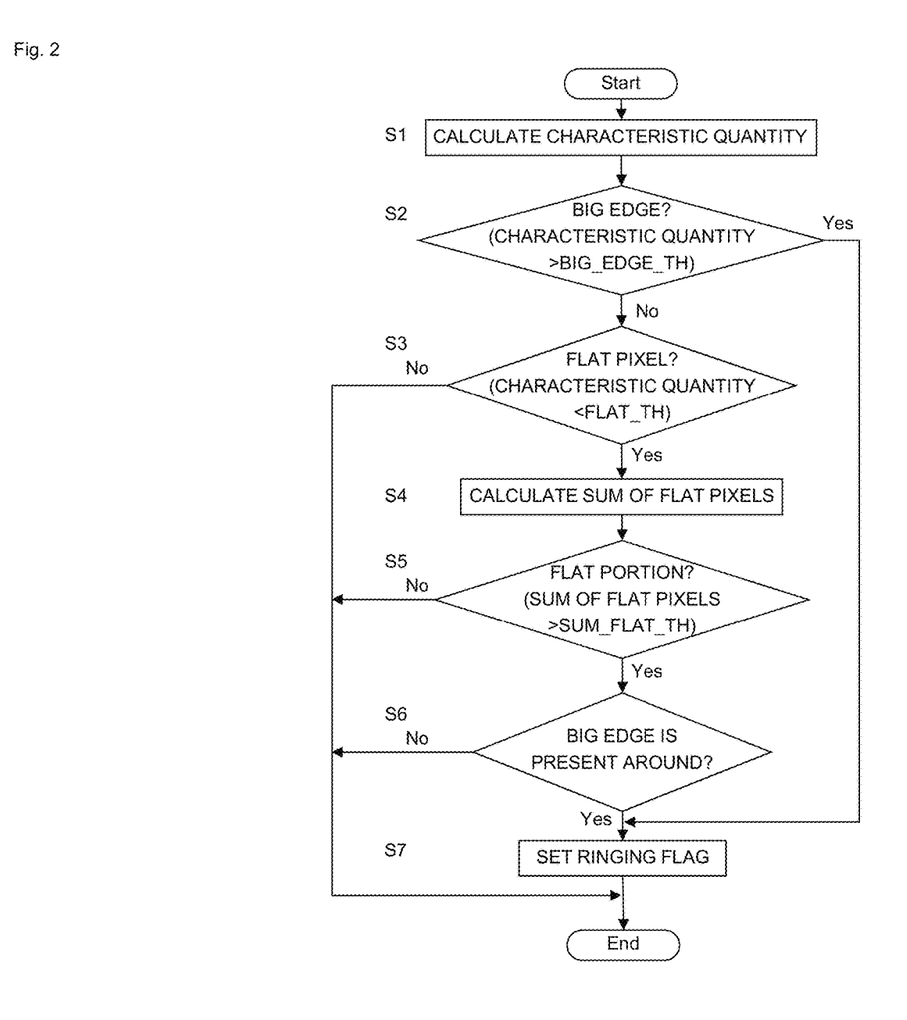
FIG. 2 is a flowchart showing a process of setting a ringing flag on a target pixel according to the one embodiment of the present invention.
Figure 3A:
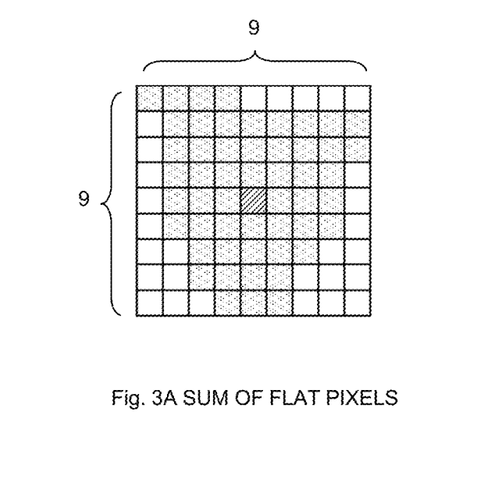
FIGS. 3A and 3B are concept diagrams showing the process of setting a ringing flag on the target pixel according to the one embodiment of the present invention, in which ringing is expected to occur on the target pixel on which a ringing flag is set; and ringing is expected not to occur on the target pixel on which a ringing flag is not set.
Figure 3B:
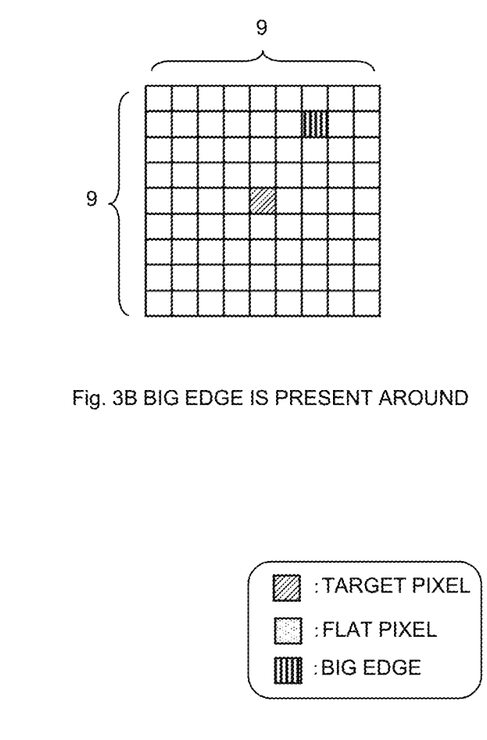

Referring now to FIGS. 1 to 3, an image processing apparatus 1 of one embodiment of the present invention will be described. FIG. 1 is a block diagram of the image processing apparatus of the one embodiment of the present invention. The image processing apparatus 1 is realized by a computer including at least a controller and a storage unit (not shown). The processor is, for example, a CPU and performs various types of arithmetic processing. The storage unit is, for example, a memory, HDD, or SSD and stores various types of data or programs. The programs may be preinstalled in the image processing apparatus 1 prior to shipment, or may be downloaded from Web sites as applications, or may be transferred from another information processing device by wire or wirelessly.

Overall Configuration

The image processing apparatus 1 includes an input image output unit 30, an image converter 10, and a ringing suppressor 20. The ringing suppressor 20 includes a ringing incidence estimation unit 21, a sharpness estimation unit 22, an adjustment factor calculator 23, and an adjuster 24.

The input image output unit 30 outputs input image data S1, which is image data inputted to the image processing apparatus 1, to the image converter 10 and ringing suppressor 20. The image converter 10 receives the input image data S1 outputted from the input image output unit 30 and performs various image conversion processes on the input image data S1. Those image conversion processes are not limited to particular ones, and one example is edge sharpening, where an edge is emphasized. Specific examples include an image conversion process involving separating the wavelength component of the input image data S1 into a low-frequency component and a high-frequency component and correcting the high-frequency component, an image conversion process involving correcting the luminance of the high-frequency component of the input image data S1, and a learning image reconfiguration process using sparse representation. The ringing suppressor 20 performs an adjustment process to suppress ringing on each pixel in the input image data converted by the image converter 10 (hereafter referred to as "converted image data S2") on the basis of the incidence of ringing or on the basis of the incidence of ringing and the sharpness level. For example, when the image converter 10 converts the input image data S1 representing an unblurred image (that is, an image having a high level of sharpness), the image may be corrected excessively and thus ringing may occur in the converted image data S2. The ringing suppressor 20 suppresses such excessive correction and thus suppresses ringing. Also, when the image converter 10 converts the input image data S1 representing a blurred image (that is, an image having a low level of sharpness) and thus corrects the image, ringing may occur around an edge in the converted image data S2. The ringing suppressor 20 suppresses such ringing also.

Ringing Suppressor 20

Next, the ringing incidence estimation unit 21, sharpness estimation unit 22, adjustment factor calculator 23, and adjuster 24 included in the ringing suppressor 20 will be described.

Ringing Incidence Estimation Unit 21

The ringing incidence estimation unit 21 estimates the incidence of ringing on the basis of the characteristic quantity of a near pixel region including a target pixel and multiple pixels adjacent to the target pixel in the input image data S1. First, the ringing incidence estimation unit 21 sets a ringing flag on the target pixel if ringing is expected to occur on the target pixel, on the basis of the characteristic quantity of the near pixel region. The ringing incidence estimation unit 21 then estimates the incidence of ringing of the target pixel on the basis of the number of pixels on which ringing flags are set in the near pixel region around the target pixel. The process of setting a ringing flag on the target pixel will be described with reference to FIG. 2.

FIG. 2 is a flowchart showing a process in which the ringing incidence estimation unit 21 sets a ringing flag on the target pixel according to the one embodiment of the present invention. Ringing is characterized as (1) being around a big edge and as (2) being remarkable in a flat portion around an edge, and the ringing incidence estimation unit 21 estimates the incidence of ringing representing the probability that ringing will occur on the target pixel included in the input image data S1, using these characteristics. Specifically, the ringing incidence estimation unit 21 estimates the incidence of ringing on the basis of the characteristic quantity of the near pixel region including the target pixel and multiple pixels adjacent to the target pixel in the input image data S1. As used herein, the term "near pixel region" refers to a region located around the target pixel and including multiple pixels near the target pixel. For example, the near pixel region may be a region located around a target pixel and including 3×3 pixels, 5×5 pixels, 7×7 pixels, or 9×9 pixels. Note that the near pixel region need not be such a region and may be a region which is located around a target pixel and has different numbers of pixels in the main scanning direction and sub-scanning direction. The number of pixels may be any number of pixels.

First, in S1, one pixel included in the input image data S1 outputted by the input image output unit 30 is regarded as a target pixel, and the characteristic quantity of the near pixel region of the target pixel is calculated. The characteristic quantity may be any type of quantity. For example, the variance or average of the luminance of the near pixel region located around the target pixel and including 3×3 pixels may be used as a characteristic quantity, or the difference in luminance between the target pixel and pixels adjacent to the target pixel may be used as a characteristic quantity. Instead of luminance, brightness or chroma may be used. Also, the number of pixels forming the near pixel region may be any pixel number. The process in S1 is performed by a characteristic quantity calculator controlled by a controller (not shown).

Next, in S2, it is determined whether the target pixel is a big edge. This determination is made by comparing the characteristic quantity of the target pixel with a predetermined first threshold (hereafter referred to as "BIG_EDGE_TH"). BIG_EDGE_TH is used to determine a big edge. As the value thereof is greater, ringing is less likely expected to occur on the target pixel. When the characteristic quantity is greater than BIG_EDGE_TH (Yes), the target pixel is determined to be a big edge, and the process proceeds to S7. In S7, a ringing flag is set on the target pixel determined to be a big edge. On the other hand, when the characteristic quantity is not greater than BIG_EDGE_TH (No), this target pixel is determined not to be a big edge, and the process proceeds to S3. The process in S2 is performed by a big edge determination unit controlled by the controller (not shown).

Next, in S3, it is determined whether the target pixel is a flat pixel. This determination is made by comparing the characteristic quantity of the target pixel with a predetermined second threshold (hereafter referred to as "FLAT_TH"). FLAT_TH is used to determine a flat pixel. As the value thereof is smaller, ringing is less likely expected to occur on the target pixel. when the characteristic quantity is smaller than FLAT_TH (Yes), the target pixel is determined to be a flat pixel, and the process proceeds to S4. On the other hand, when the characteristic quantity is not smaller than FLAT_TH (No), the target pixel is determined not to be a flat pixel, and the process is complete. The process in S3 is performed by a flat pixel determination unit controlled by the controller (not shown).

Next, in S4, the sum of flat pixels in the near pixel region around the target pixel is calculated. For example, when the target pixel is determined to be a flat pixel, it is determined whether the characteristic quantity of each of the other pixels near the target pixel in the near pixel region is smaller than FLAT_TH, as shown in FIG. 3A. Note that the characteristic quantities of the other pixels may be those calculated in advance in S1. The near pixel region is a region including, for example, 3×3, 5×5, 7×7, 9×9, 11×11, 13×13, or 15×15 pixels, preferably 5×5 to 13×13 pixels, more preferably, 7×7 to 11×11 pixels. As an example, in the present embodiment, the process is performed using a near pixel region including 9×9 pixels. Also, the number of pixels forming the near pixel region may be any pixel number. The process in S4 is performed by a sum calculator controlled by the controller (not shown).

Next, in S5, it is determined whether the near pixel region around the target pixel is a flat portion. This determination is made by comparing the sum of flat pixels in the near pixel region with a predetermined third threshold (hereafter referred to as "SUM_FLAT_TH"). SUM_FLAT_TH is used to determine whether the near pixel region around the target pixel is a flat portion. As the value thereof is greater, ringing is less likely expected to occur in the target pixel. For example, assume that SUM_FLAT_TH is 45. Since the sum of flat pixels in the near pixel region is 53 (including the target pixel; the target pixel plus 52 pixels whose characteristic quantities are greater than SUM_FLAT_TH) in an example shown in FIG. 3A, the sum of flat pixels is greater than SUM_FLAT_TH. Accordingly, the near pixel region around the target pixel is determined to be a flat portion (Yes), and the process proceeds to S6. On the other hand, when the sum of flat pixels is not greater than SUM_FLAT_TH (No), the near pixel region around the target pixel is determined not to be a flat portion, and the process is complete. The process in S5 is performed by a flat portion determination unit controlled by the controller (not shown).

Next, in S6, it is determined whether a big edge is present in the near pixel region around the target pixel. Specifically, it is determined whether a pixel whose characteristic quantity is greater than BIG_EDGE_TH (that is, a pixel determined to be a big edge) is present among the other pixels in the near pixel region around the target pixel. The near pixel region is a region including, for example, 3×3, 5×5, 7×7, 9×9, 11×11, 13×13, or 15×15 pixels, preferably 5×5 to 13×13 pixels, more preferably 7×7 to 11×11 pixels. As an example, in the present embodiment, the process is performed using a near pixel region including 9×9 pixels. This determination is made on the basis of whether the characteristic quantity of each of the other pixels in the near pixel region is greater than BIG_EDGE_TH, as in S2. Note that the characteristic quantities of the other pixels may be those calculated in advance in S1. For example, in the case of FIG. 3B, a pixel whose characteristic quantity is greater than BIG_EDGE_TH (a pixel determined to be a big edge) is present in the near pixel region (Yes) and therefore the process proceeds to S7. On the other hand, when no big edge is present in the near pixel region (No), the process is complete. The process in S6 is performed by a near pixel determination unit controlled by the controller (not shown).

Next, in S7, a ringing flag is set on the target pixel. Ringing is characterized as (1) being around a big edge and as (2) being remarkable in a flat portion around an edge as described above. The target pixel that has passed through the route of S6 satisfies these characteristics and therefore a ringing flag is set on the target pixel. A ringing flag is also set on the target pixel that has passed through the route of S2, which has been determined to be a big edge and on which ringing is expected to occur. The process in S7 is performed by a ringing flag setting unit controlled by the controller (not shown).

Then, the above processes (S1 to S7) are repeatedly performed on pixels adjacent to the target pixel on which a ringing flag is set, and all pixels included in the input image data S1 are subjected to a determination on whether a ringing flag should be set thereon.

After the above processes are performed on all the pixels, the ringing incidence estimation unit 21 calculates the number of ringing flags set on the pixels in the near pixel region around the target pixel. The calculation result is standardized by dividing it by the number of pixels forming the near pixel region, and the ringing incidence representing the probability that ringing will occur is calculated as a value of 0 to 1. For example, in the case of a near pixel region including 7×7 pixels, the number of pixels on which ringing flags are set is a value of 0 to 49. By dividing this value by 49 for standardization, the ringing incidence is calculated as 0 to 1. Note that the number of pixels forming the near pixel region may be any number and may be, for example, 9×9.

Sharpness Estimation Unit 22

Referring back to FIG. 1, the sharpness estimation unit 22 will be described. The sharpness estimation unit 22 estimates the sharpness emphasis level representing the intensity of sharpness of the input image data S1. The sharpness emphasis level is an index indicating the level of blurring of an image. For example, an image that is enlarged but is not blurred is an image having a high sharpness emphasis level, that is, a high-sharpness image. On the other hand, an image that is enlarged and thus blurred is an image having a low sharpness emphasis level, that is, a low-sharpness image. The sharpness estimation unit 22 may estimate the sharpness emphasis level using any method. For example, the sharpness emphasis level may be estimated on the basis of the sum S_diff of variances of pixel values included in image data obtained by processing the input image data S1 using a low-pass filter and the sum S_org of variances of pixel values included in the input image data S1. Specifically, the value of S_diff/S_org is used as the sharpness emphasis level. Typically, the sum of variances of pixel values in image data obtained by processing using a low-pass filter is smaller than that of the original image data. For this reason, S_diff<S_org holds true and therefore the sharpness emphasis level (S_diff/S_org) ranges from 0 to 1. The sharpness estimation unit 22 then outputs the sharpness emphasis level to the adjustment factor calculator 23. Note that all pixels included in the input image data S1 have the same sharpness emphasis level.

Adjustment Factor Calculator 23

Next, referring to FIG. 1, the adjustment factor calculator 23 will be described. The adjustment factor calculator 23 calculates an adjustment factor α by which the gradation value of the target pixel included in the converted image data is multiplied. α is a value by which the converted image data S2 is multiplied in an adjustment process (to be discussed later). As the value of α is smaller, excessive correction on the converted image data S2 is suppressed to a greater extent. To properly suppress ringing while considering the sharpness emphasis level of the input image data S1, the adjustment coefficient calculator 23 calculates a using different methods on the basis of whether a ringing flag is set on the target pixel. Specifically, a is calculated using the following formulas.

When a ringing flag is set on the target pixel: α=(1−ringing incidence)×(1−sharpness emphasis level)

When a ringing flag is not set on the target pixel: α=(1−sharpness emphasis level)

Since both the incidence of ringing and the sharpness emphasis level range from 0 to 1, both (1−ringing incidence) and (1−sharpness emphasis level) range from 0 to 1. Accordingly, an adjustment factor α when a ringing flag is set on the target pixel is smaller than that when a ringing flag is not set on the target pixel. In other words, a is calculated such that excessive correction on the converted image data S2 when a ringing flag is set on the target pixel is suppressed to a greater extent than when a ringing flag is not set on the target pixel. Also, when a ringing flag is set on the target pixel, a when a greater number of big edges are present around the target pixel (that is, the ringing incidence is higher) is smaller than that when a smaller number of big edges are present around the target pixel (that is, the ringing incidence is lower). That is, as a greater number of big edges are present around the target pixel, excessive correction on the converted image data S2 is suppressed to a greater extent. As seen above, when a ringing flag is not set on the target pixel, the adjustment factor calculator 23 calculates a on the basis of the sharpness emphasis level; when a ringing flag is set on the target pixel, the adjustment factor calculator 23 calculates a on the basis of the incidence of ringing and the sharpness emphasis level. The adjustment factor calculator 23 then outputs the calculated a to the adjuster 24.

Adjuster 24

Next, referring to FIG. 1, the adjuster 24 will be described. The adjuster 24 performs different adjustment processes on the target pixel on the basis of whether a ringing flag is set on the target pixel. Specifically, the adjuster 24 calculates the gradation value of the target pixel included in output image data S3 by mixing the gradation value of the target pixel included in the input image data S1 and the gradation value of the target pixel included in the converted image data S2 at a predetermined ratio. More specifically, the adjuster 24 performs an adjustment process by multiplying or dividing the gradation value of the target pixel included in the input image data S1 and the gradation value of the target pixel included in the converted image data S2 by α or a value attributable to α. The adjuster 24 then outputs, to the subsequent stage, the gradation value of the target pixel included in the output image data S3 obtained by performing the adjustment process. The gradation value of the target pixel included in the output image data S3 is obtained by an adjustment process based on the following formula.

The gradation value of the target pixel included in the output image data $S3$=(the gradation value of the target pixel included in the converted image data S2)×α+(the gradation value of the target pixel included in the input image data S1)×(1−α)

The adjuster 24 can suppress excessive correction in the image conversion process performed by the image converter 10 by multiplying the gradation value of the target pixel included in the converted image data S2 by α, multiplying the gradation value of the target pixel included in the input image data S1 by (1+α), and adding up the resulting values. Since α when a ringing flag is set on the target pixel is smaller than that when a ringing flag is not set on the target pixel, a component attributable to the converted image data S2, of the gradation value of the target pixel included in the output image data S3 can be suppressed to a greater extent. Also, when a ringing flag is set on the target pixel, excessive correction on the converted image data S2 is suppressed to a greater extent as a greater number of big edges are present around the target pixel. While the adjustment process according to the present embodiment involves multiplying the gradation value of the target pixel included in the converted image data S2 by α and multiplying the gradation value of the target pixel included in the input image data S1 by (1−α), the adjustment process may be performed in a different manner. For example, the gradation value of the target pixel included in the converted image data S2 or the gradation value of the target pixel included in the input image data S1 may be divided by 1/α or 1/1−α. Also, an adjustment process may be performed by separating the input image data S1 and the converted image data S2 into high-frequency components and low-frequency components using a low-pass filter or high-pass filter and performing the above adjustment process only on the gradation values of the target pixels included in the high-frequency components. In this case, the adjusted high-frequency components and the non-adjusted low-frequency components are combined together, and the combined components are used as the gradation value of the target pixel included in the output image data S3.

Ringing Estimation Result by Ringing Incidence Estimation Unit 21

Figure 4A:
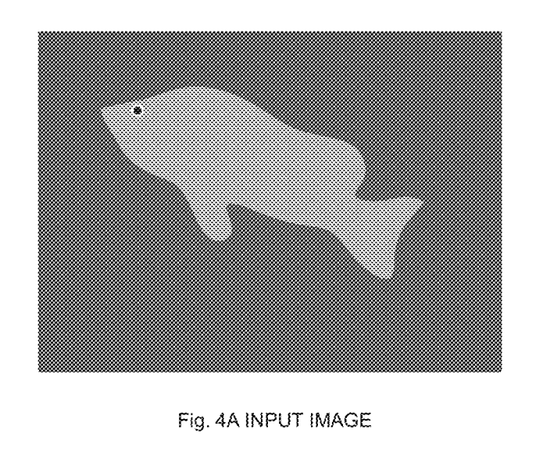
FIGS. 4A and 4B are diagrams showing a ringing estimation result according to the one embodiment of the present invention, in which pixels where ringing is expected to occur are shown in white.
Figure 4B:
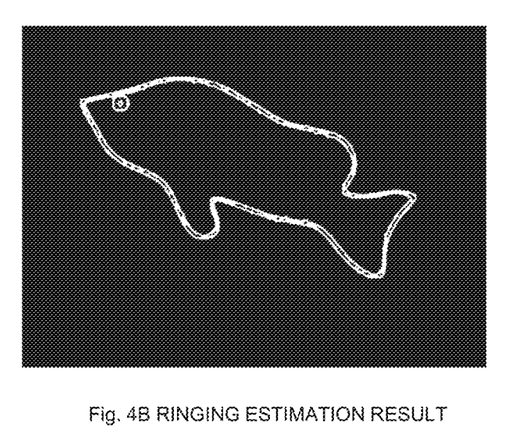

Referring now to FIG. 4, an actual image obtained by performing a ringing estimation process using the ringing incidence estimation unit 21 will be described. FIG. 4A shows an input image represented by the input image data S1, and FIG. 4B shows an image representing a ringing estimation result obtained using the ringing incidence estimation unit 21. Specifically, pixels on which ringing flags have been set by performing the ringing flag setting process shown in FIG. 2 using the ringing incidence estimation unit 21 are shown in white in FIG. 4B. There are great differences between the gradation values of the pixels on the boundaries between living things and the background (sea) (that is, big edges are present around the boundaries) as shown in FIG. 4A, so that ringing flags can be set around the boundaries.

As seen above, in the present embodiment, the ringing suppressor 20 performs the adjustment process to suppress excessive correction while considering the sharpness emphasis level, on the gradation value of the target pixel included in the converted image data S2 which has been excessively corrected by the image converter 10 and has remarkable ringing around a big edge. Thus, the ringing can be suppressed considering the sharpness of the image data.

While the various embodiments have been described, the present invention is not limited thereto.

The image processing apparatus 1 may be provided as a PC, cloud computing, or a set-top box connected to a computer. The image conversion device 1 may also be provided as an application-specific integrated circuit (ASIC), field-programmable gate array (FPGA), or dynamic reconfigurable processor (DRP) that implements the functions of the image processing apparatus 1. A program for implementing the functions of the image processing apparatus 1 may be distributed through the Internet or the like.

While, in FIG. 1, the ringing suppressor 20 includes the ringing incidence estimation unit 21, sharpness estimation unit 22, adjustment factor calculator 23, and adjuster 24, some of these elements may be constructed outside. For example, the ringing incidence estimation unit 21 and sharpness estimation unit 22 may be constructed outside, and the ringing suppressor 20 may include the adjustment factor calculator 23 and adjuster 24.

While the ringing suppressor 20 includes the ringing incidence estimation unit 21 and sharpness estimation unit 22, it may perform an adjustment process using one of these elements while stopping the other. when the ringing incidence estimation unit 21 is stopped and a ringing flag is set on the target pixel, "α=[1−constant (0 to 1)]×(1−sharpness emphasis level)" may be used in place of "α=(1−ringing incidence)×(1−sharpness emphasis level)." Conversely, when the sharpness estimation unit 22 is stopped, the sharpness emphasis level when calculating α may be a constant (0 to 1). In this case, the constant when a ringing flag is set on the target pixel may be smaller than that when a ringing flag is not set on the target pixel.

DESCRIPTION OF REFERENCE SIGNS

1: image processing apparatus, 10: image converter, 20: ringing suppressor, 21: ringing incidence estimation unit, 22: sharpness estimation unit, 23: adjustment factor calculator, 24: adjuster, 30: input image output unit

The invention claimed is:
1. An image processing apparatus comprising:
   a ringing incidence estimation unit configured to estimate, on each pixel, an incidence of ringing representing a probability that ringing will occur, on the basis of input image data;
   a sharpness estimation unit configured to estimate a sharpness emphasis level representing intensity of sharpness of an input image represented by the input image data, on the basis of the input image data, wherein all pixels included in the input image data have the same sharpness emphasis level; and
   an adjuster configured to perform an adjustment process to suppress a level of image conversion on each pixel in converted image data obtained by performing the image conversion on the input image data, on the basis of the incidence of ringing and/or the sharpness emphasis level,
   wherein the ringing incidence estimation unit comprises a ringing flag setting unit configured to regard one pixel included in the input image data as a target pixel and to, when ringing is expected to occur on the target pixel, on the basis of a characteristic quantity of a near pixel region including the target pixel and a plurality of pixels near the target pixel, set a ringing flag on the target pixel, and
   the adjuster performs different adjustment processes on the target pixel on the basis of whether the ringing flag is set on the target pixel.

2. The image processing apparatus of claim 1, wherein when the ringing flag is set on the target pixel, the adjuster performs, on the target pixel, an adjustment process to suppress the level of the image conversion to a greater extent than when the ringing flag is not set on the target pixel.

3. The image processing apparatus of claim 1, wherein when the ringing flag is not set on the target pixel, the adjuster performs an adjustment process on the target pixel on the basis of the sharpness emphasis level.

4. The image processing apparatus of claim 1, wherein when the ringing flag is set on the target pixel, the adjuster performs an adjustment process on the target pixel on the basis of the incidence of ringing and the sharpness emphasis level.

5. The image processing apparatus of claim 1, wherein an adjustment process performed by the adjuster involves calculating a gradation value of the target pixel included in output image data by mixing a gradation value of the target pixel included in the input image data and a gradation value of the target pixel included in the converted image data at a predetermined ratio.

6. The image processing apparatus of claim 1, further comprising an adjustment factor calculator configured to calculate an adjustment factor by which a gradation value of the target pixel included in the converted image data is multiplied, wherein
the adjuster multiplies the gradation value of the target pixel included in the converted image data by the adjustment factor and multiplies a gradation value of the target pixel included in the input image data by a value attributable to the adjustment factor.

7. The image processing apparatus of claim 1, wherein the adjustment factor calculator calculates the adjustment factor on the basis of the sharpness emphasis level, or the sharpness emphasis level and the incidence of ringing.

8. The image processing apparatus of claim 1, wherein the ringing incidence estimation unit estimates the incidence of ringing of the target pixel on the basis of the number of pixels on which the ringing flag is set in the near pixel region.

9. The image processing apparatus of claim 1, wherein the sharpness estimation unit estimates the sharpness emphasis level on the basis of a sum of variances of pixel values included in image data obtained by processing the input image data using a low-pass filter and a sum of variances of pixel values included in the input image data.

10. A non-transitory computer readable medium storing a program causing a computer to function as:
a ringing incidence estimation unit configured to estimate, on each pixel, an incidence of ringing representing a probability that ringing will occur, on the basis of input image data;
a sharpness estimation unit configured to estimate a sharpness emphasis level representing intensity of sharpness of an input image represented by the input image data, on the basis of the input image data, wherein all pixels included in the input image data have the same sharpness emphasis level; and
an adjuster configured to perform an adjustment process to suppress a level of image conversion on each pixel in converted image data obtained by performing the image conversion on the input image data, on the basis of the incidence of ringing and/or the sharpness emphasis level,
wherein the ringing incidence estimation unit comprises a ringing flag setting unit configured to regard one pixel included in the input image data as a target pixel and to, when ringing is expected to occur on the target pixel, on the basis of a characteristic quantity of a near pixel region including the target pixel and a plurality of pixels near the target pixel, set a ringing flag on the target pixel, and
the adjuster performs different adjustment processes on the target pixel on the basis of whether the ringing flag is set on the target pixel.

* * * * *